United States Patent
Kodama

(10) Patent No.: US 9,964,148 B2
(45) Date of Patent: May 8, 2018

(54) FLUID DYNAMIC BEARING APPARATUS, SPINDLE MOTOR, AND DISK DRIVE APPARATUS

(71) Applicant: Nidec Corporation, Kyoto (JP)

(72) Inventor: Mitsuo Kodama, Kyoto (JP)

(73) Assignee: Nidec Corporation, Kyoto (JP)

(*) Notice: Subject to any disclaimer, the term of this patent is extended or adjusted under 35 U.S.C. 154(b) by 447 days.

(21) Appl. No.: 14/934,721

(22) Filed: Nov. 6, 2015

(65) Prior Publication Data

US 2016/0223013 A1  Aug. 4, 2016

(30) Foreign Application Priority Data

Jan. 30, 2015  (JP) ................. 2015-017141

(51) Int. Cl.
| | |
|---|---|
| *F16C 32/06* | (2006.01) |
| *F16C 33/74* | (2006.01) |
| *F16C 17/10* | (2006.01) |
| *G11B 19/20* | (2006.01) |
| *F16C 33/10* | (2006.01) |

(52) U.S. Cl.
CPC ........ *F16C 32/0607* (2013.01); *F16C 17/107* (2013.01); *F16C 33/1085* (2013.01); *F16C 33/745* (2013.01); *G11B 19/2036* (2013.01); *F16C 33/1065* (2013.01); *F16C 2370/12* (2013.01)

(58) Field of Classification Search
CPC .. H02K 7/085; H02K 5/1675; F16C 2370/12; F16C 33/107; F16C 33/745
See application file for complete search history.

(56) References Cited

U.S. PATENT DOCUMENTS

| | | | | |
|---|---|---|---|---|
| 6,066,903 A * | 5/2000 | Ichiyama | .............. | F16C 17/107 310/90 |
| 6,900,567 B2 * | 5/2005 | Aiello | .................. | F16C 17/107 310/90 |
| 7,265,469 B2 * | 9/2007 | Kodama | .............. | F16C 17/026 310/90 |

(Continued)

FOREIGN PATENT DOCUMENTS

| | | |
|---|---|---|
| JP | 2014-192926 A | 10/2014 |
| WO | 2009/145159 A1 | 12/2009 |

*Primary Examiner* — Dang Le
(74) *Attorney, Agent, or Firm* — Keating & Bennett, LLP

(57) ABSTRACT

A fluid dynamic bearing apparatus includes a stationary body, a rotating body, and a lubricating oil arranged therebetween. One of the stationary and rotating bodies includes a shaft. Another one of the stationary and rotating bodies includes a sleeve. The sleeve includes a communicating hole arranged to pass therethrough in an axial direction or obliquely with respect to the axial direction. A groove array is defined in the stationary body or the rotating body to cause the lubricating oil to flow into the communicating hole. An opening area of an inlet of the communicating hole may be arranged to be greater than a cross-sectional area of a tubular portion of the communicating hole to make it easier for the lubricating oil to flow into the communicating hole. Further, the shape of the inlet may be modified to make a loss coefficient at the inlet lower than a loss coefficient at an outlet. This contributes to preventing a leakage of the lubricating oil.

18 Claims, 14 Drawing Sheets

(56) References Cited

U.S. PATENT DOCUMENTS

| | | | |
|---|---|---|---|
| 8,337,086 B2* | 12/2012 | Oe | F16C 33/103 |
| | | | 384/100 |
| 8,511,899 B2* | 8/2013 | Hori | F16C 17/107 |
| | | | 384/107 |
| 2007/0177832 A1* | 8/2007 | Gotoh | F16C 17/107 |
| | | | 384/107 |
| 2009/0129710 A1* | 5/2009 | Ito | F16C 17/107 |
| | | | 384/107 |
| 2010/0296190 A1 | 11/2010 | Yamada et al. | |
| 2014/0233133 A1* | 8/2014 | Jeon | H02K 5/10 |
| | | | 360/99.08 |
| 2014/0368951 A1 | 12/2014 | Lee et al. | |
| 2016/0153490 A1* | 6/2016 | Saito | F16C 17/107 |
| | | | 360/99.08 |

* cited by examiner

FLUID DYNAMIC BEARING APPARATUS, SPINDLE MOTOR, AND DISK DRIVE APPARATUS

BACKGROUND OF THE INVENTION

1. Field of the Invention

The present invention relates to a fluid dynamic bearing apparatus, a spindle motor, and a disk drive apparatus.

2. Description of the Related Art

Spindle motors arranged to rotate disks are typically installed in hard disk apparatuses and optical disk apparatuses. Such a spindle motor includes a stationary portion fixed to a housing of the apparatus, and a rotating portion arranged to rotate while supporting the disk(s). The spindle motor is arranged to produce a torque by magnetic flux generated between a stator and a magnet, whereby the rotating portion is caused to rotate with respect to the stationary portion.

The stationary portion and the rotating portion of the spindle motor are joined to each other through a fluid dynamic bearing. A known spindle motor including a fluid dynamic bearing is described, for example, in WO 2009/145159. A rotating member of the spindle motor described in WO 2009/145159 includes a communicating hole. In addition, a minute gap defined between a stationary portion and a rotating portion and the communicating hole of the rotating member are filled with a lubricating oil. Moreover, the lubricating oil has a pair of liquid surfaces defined at upper and lower positions, respectively.

In a spindle motor of this type, the lubricating oil may be intentionally caused to circulate, causing the lubricating oil to flow from a minute gap defined between a shaft and the rotating member into the communicating hole defined in the rotating member and then back into the minute gap, in order to discharge any air bubble introduced into the lubricating oil to an outside. However, depending on the shape of an end opening of the communicating hole, a high channel resistance may occur. A higher channel resistance increases a loss coefficient when the lubricating oil flows into the communicating hole, making it harder for the lubricating oil to flow into the communicating hole. If this happens, the amount of a portion of the lubricating oil which flows toward a liquid surface of the lubricating oil instead of flowing into the communicating hole is increased. This causes a rise of the level of the liquid surface of the lubricating oil, increasing the likelihood that a leakage of the lubricating oil to the outside will occur.

SUMMARY OF THE INVENTION

A fluid dynamic bearing apparatus according to a preferred embodiment of the present invention includes a stationary body, a rotating body supported to be rotatable with respect to the stationary body, and a lubricating oil arranged between the stationary body and the rotating body. One of the stationary body and the rotating body includes a shaft arranged along a rotation axis extending in a vertical direction, and an upper annular portion being annular and arranged around the shaft. Another one of the stationary body and the rotating body includes a sleeve arranged below the upper annular portion, and including an inner circumferential surface arranged opposite to an outer circumferential surface of the shaft with a bearing gap intervening therebetween. The sleeve includes a communicating hole arranged to pass therethrough in an axial direction or obliquely with respect to the axial direction. The stationary body or the rotating body includes a groove array arranged in a herringbone pattern or a spiral pattern to generate a flow of the lubricating oil. The lubricating oil is arranged to fill the bearing gap, the groove array, and the communicating hole. The groove array is arranged to cause the lubricating oil to flow from the bearing gap into the communicating hole. The communicating hole includes an inlet through which the lubricating oil flows into the communicating hole, and an outlet through which the lubricating oil flows out of the communicating hole. A loss coefficient at the inlet is lower than a loss coefficient at the outlet.

According to the above preferred embodiment of the present invention, a reduction in a loss coefficient for the lubricating oil when the lubricating oil flows into the communicating hole is achieved. This makes it easier for the lubricating oil to flow into the communicating hole. This contributes to preventing a leakage of the lubricating oil.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a rotation axis of a spindle motor is referred to by the term "axial direction", "axial", or "axially", that directions perpendicular to the rotation axis of the spindle motor are each referred to by the term "radial direction", "radial", or "radially", and that a direction along a circular arc centered on the rotation axis of the spindle motor is referred to by the term "circumferential direction", "circumferential", or "circumferentially". It is also assumed herein that an axial direction is a vertical direction, and that a side on which an upper annular portion is arranged with respect to a sleeve is an upper side, and the shape of each member or portion and relative positions of different members or portions will be described based on the above assumptions. It should be noted, however, that the above definitions of the vertical direction and the upper and lower sides are not meant to restrict in any way the orientation of a fluid dynamic bearing apparatus, a spindle motor, or a disk drive apparatus according to any preferred embodiment of the present invention when in use.

Also note that the wording "parallel direction" as used herein includes both parallel and substantially parallel directions. Also note that the wording "perpendicular direction" as used herein includes both perpendicular and substantially perpendicular directions.

Figure 1:
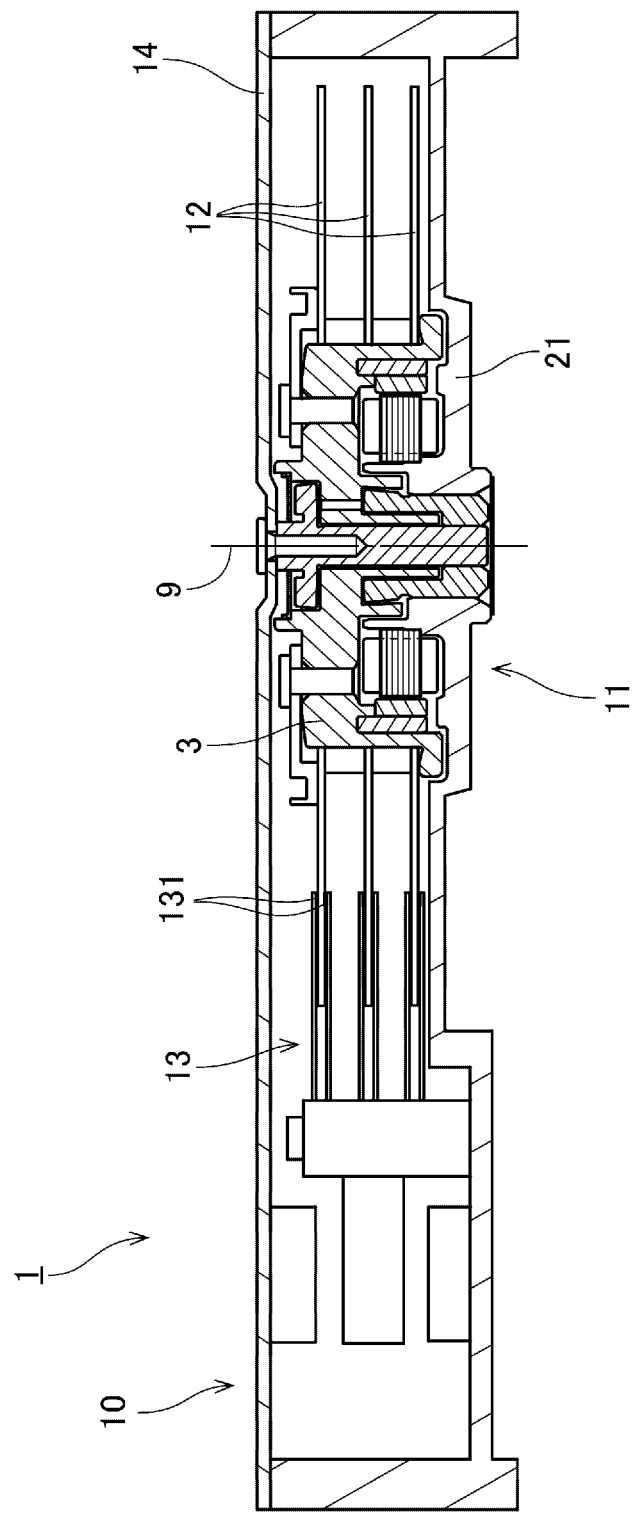
FIG. 1 is a vertical cross-sectional view of a disk drive apparatus according to a preferred embodiment of the present invention.

FIG. 1 is a vertical cross-sectional view of a disk drive apparatus 1 in which a spindle motor 11 according to a preferred embodiment of the present invention is installed. The disk drive apparatus 1 is arranged to rotate magnetic disks 12, each of which includes a circular hole in a center thereof, to perform reading and writing of information from or to the magnetic disks 12. As illustrated in FIG. 1, the disk drive apparatus 1 includes the spindle motor 11, the magnetic disks 12, which are three in number, an access portion 13, and a top cover 14.

The spindle motor 11 is arranged to rotate the three magnetic disks 12 about a rotation axis 9 while supporting the three magnetic disks 12. The spindle motor 11 includes a base plate 21 arranged to extend perpendicularly to the rotation axis 9. An upper side of the base plate 21 is covered with the top cover 14. A rotating portion 3 of the spindle motor 11, the three magnetic disks 12, and the access portion 13 are accommodated inside a case 10 defined by the base plate 21 and the top cover 14. The access portion 13 is arranged to move heads 131 along recording surfaces of the magnetic disks 12 to perform the reading and the writing of information from or to the magnetic disks 12.

Note that the number of magnetic disks 12 included in the disk drive apparatus 1 may alternatively be one, two, or more than three. Also note that the access portion 13 may be arranged to perform at least one of the reading and the writing of information from or to the magnetic disks 12.

An interior space of the case 10 is preferably a clean space with extremely little dirt or dust. According to the present preferred embodiment, the interior of the case 10 is filled with a clean air. Note, however, that the interior of the case 10 may alternatively be filled with a helium gas, a hydrogen gas, or a nitrogen gas instead of air. Also note that the interior of the case 10 may alternatively be filled with a mixture of any of these gases and air.

Figure 2:
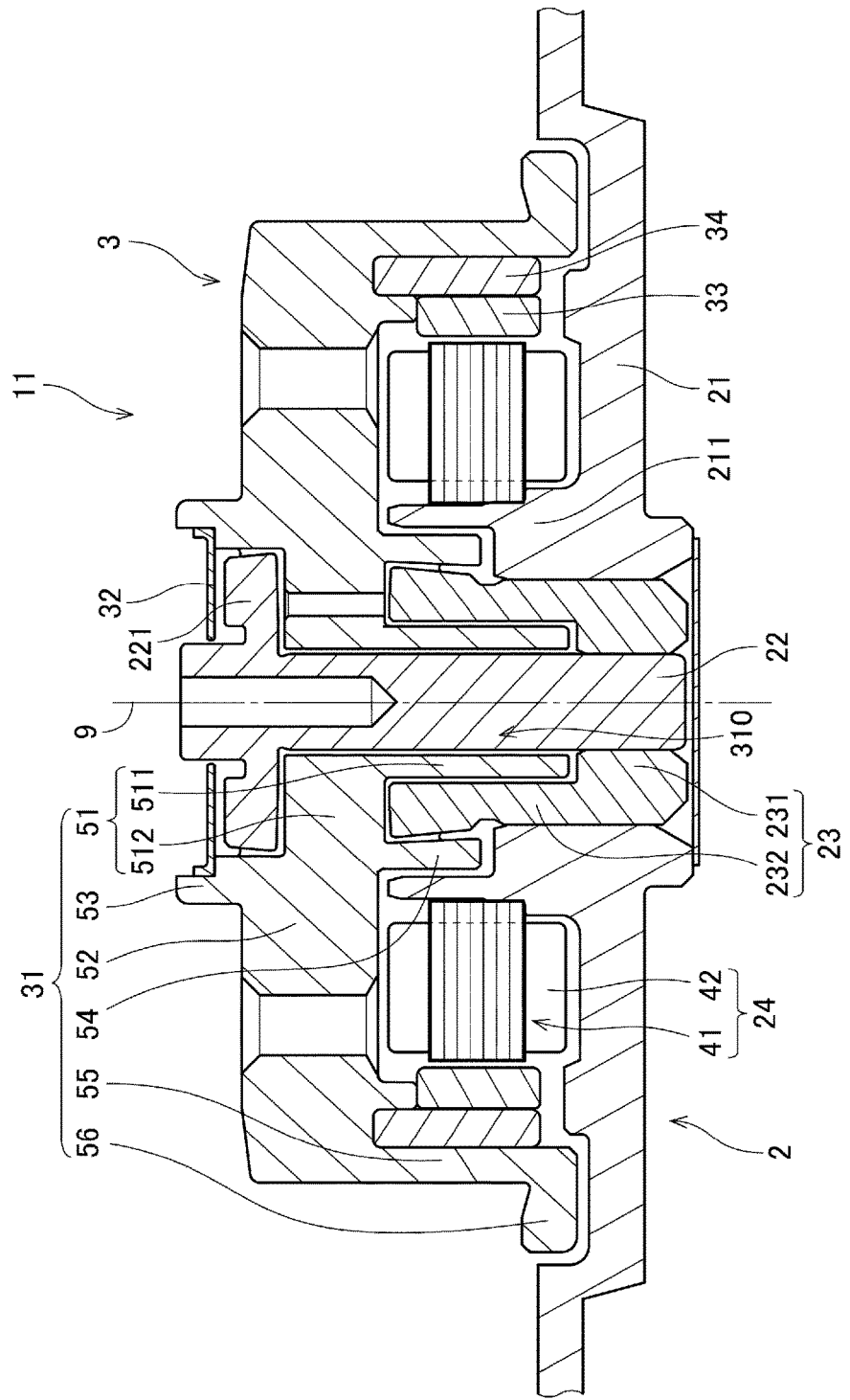
FIG. 2 is a vertical cross-sectional view of a spindle motor according to the above preferred embodiment of the present invention.

Next, the structure of the spindle motor 11 used in the disk drive apparatus 1 will now be described in more detail below. FIG. 2 is a vertical cross-sectional view of the spindle motor 11. As illustrated in FIG. 2, the spindle motor 11 includes a stationary portion 2 and the rotating portion 3. The stationary portion 2 is arranged to be stationary relative to the case 10 of the disk drive apparatus 1. The rotating portion 3 is supported to be rotatable with respect to the stationary portion 2.

The stationary portion 2 includes the base plate 21, a shaft 22, a lower annular member 23, and a stator 24.

The base plate 21 is arranged to extend perpendicularly or substantially perpendicularly to the rotation axis 9 below the stator 24, a rotating member 31 described below, the magnetic disks 12, and the access portion 13.

The shaft 22 is arranged to extend along the rotation axis 9. As illustrated in FIG. 1, an upper end portion of the shaft 22 is fixed to the top cover 14 of the disk drive apparatus 1. Meanwhile, a lower end portion of the shaft 22 is fixed to a cylindrical holder portion 211 of the base plate 21 through the lower annular member 23.

As illustrated in FIG. 2, the shaft 22 includes an upper annular portion 221, which is annular in shape. The upper annular portion 221 is arranged to project radially outward in the vicinity of the upper end portion of the shaft 22. The upper annular portion 221 is arranged between an upper surface of a sleeve flange 512, which will be described below, and a lower surface of a cap 32, which will be described below. The upper annular portion 221 is a portion of a member constituting the shaft 22. Note, however, that the upper annular portion 221 and the shaft 22 may alternatively be defined by separate members.

The lower annular member 23 is arranged below the upper annular portion 221, and is arranged to surround the shaft 22 in an annular shape. Note, however, that the shaft 22 and the lower annular member 23 may alternatively be defined by a single continuous monolithic member. The lower annular member 23 includes a bottom portion 231 and a wall portion 232. The bottom portion 231 is arranged to extend in an annular shape below an inner cylindrical portion 511 of a sleeve 51, which will be described below. An inner circumferential surface of the bottom portion 231 is fixed to an outer circumferential surface of the shaft 22. The wall portion 232 is arranged to extend upward from the bottom portion 231 to substantially assume the shape of a cylinder radially outside of the inner cylindrical portion 511. An outer circumferential surface of the wall portion 232 is fixed to an inner circumferential surface of the cylindrical holder portion 211.

The stator 24 includes a stator core 41 and a plurality of coils 42. The stator core 41 is fixed to an outer circumferential surface of the cylindrical holder portion 211. Note that the stator core 41 may be fixed to a stationary body of a fluid dynamic bearing apparatus 6, which will be described below, directly or indirectly with another member intervening therebetween.

The rotating portion 3 includes the rotating member 31, the cap 32, a magnet 33, and a yoke 34.

The rotating member 31 is arranged to extend in an annular shape around the shaft 22. The rotating member 31 includes a central through hole 310 arranged to pass therethrough in the vertical direction. At least a portion of the shaft 22 is accommodated in the central through hole 310. As illustrated in FIG. 2, the rotating member 31 includes the sleeve 51, a top plate portion 52, an upper projecting portion 53, a lower projecting portion 54, an outer cylindrical portion 55, and a disk support portion 56.

The sleeve 51 is arranged to surround the shaft 22 in an annular shape below the upper annular portion 221 and above the bottom portion 231 of the lower annular member 23. A portion of the rotating member 31 which is arranged between the upper annular portion 221 and the lower annular member 23 and which substantially assumes the shape of the letter "L" in a vertical section is referred to as the sleeve 51. The shape of the sleeve 51 will be described in detail below. The top plate portion 52 is arranged to extend substantially in the shape of a disk radially outside of the sleeve 51 and above the stator 24.

Note that the rotating member 31 may not necessarily be defined by a single monolithic member. For example, the sleeve 51 and a combination of the top plate portion 52, the upper projecting portion 53, the lower projecting portion 54, the outer cylindrical portion 55, and the disk support portion 56 may be defined by separate members.

The magnet 33 is arranged radially outside of the stator 24.

Figure 3:
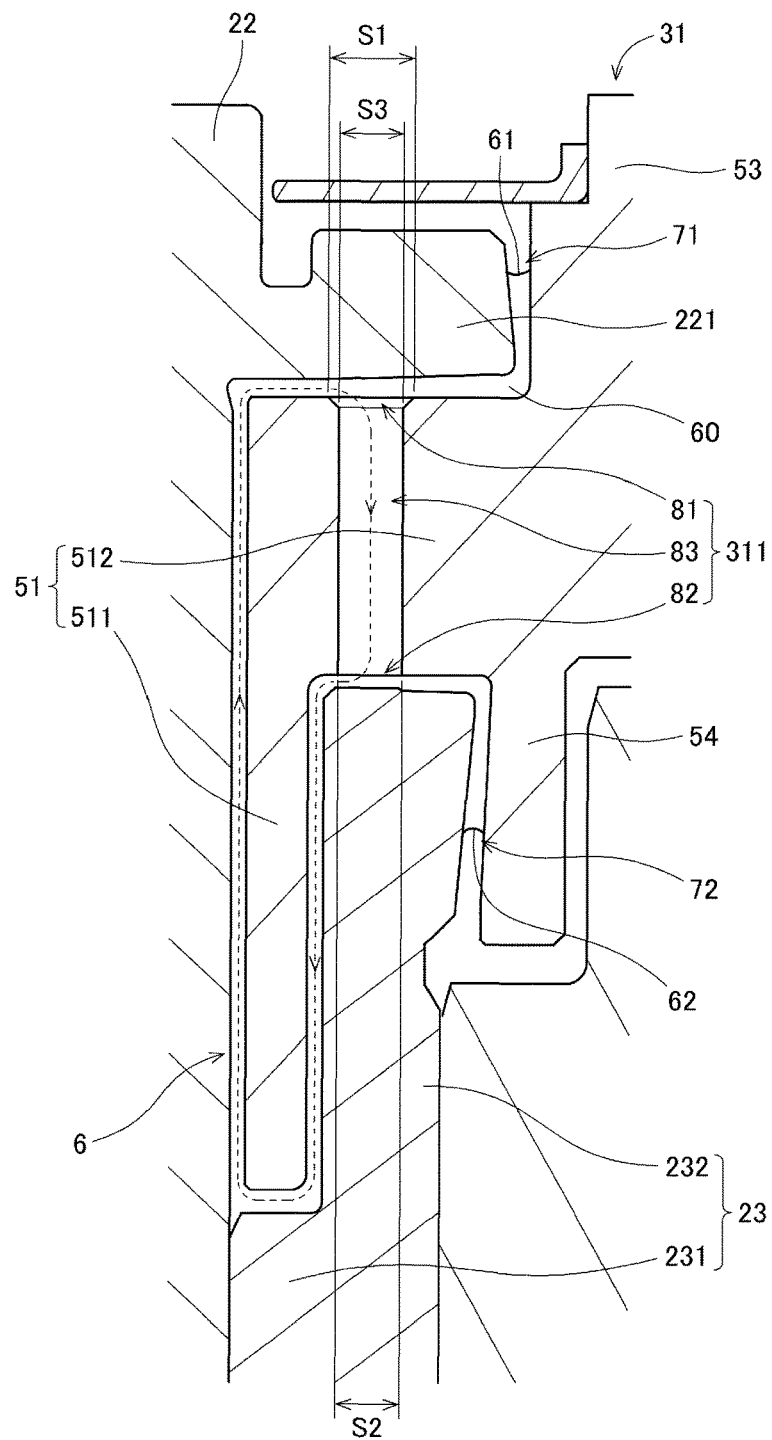
FIG. 3 is a partial vertical cross-sectional view of the spindle motor according to the above preferred embodiment of the present invention.

Next, the structure of the fluid dynamic bearing apparatus 6, which is included in the spindle motor 11, will now be described below. FIG. 3 is a partial vertical cross-sectional view of the spindle motor 11, illustrating the fluid dynamic bearing apparatus 6 and its vicinity.

As illustrated in FIG. 3, the sleeve 51 includes the inner cylindrical portion 511 and the sleeve flange 512. The inner cylindrical portion 511 is arranged to extend in the axial direction to substantially assume the shape of a cylinder, below the upper annular portion 221, above the bottom portion 231 of the lower annular member 23, and radially inside of the wall portion 232 of the lower annular member 23. An inner circumferential surface of the inner cylindrical portion 511 is arranged radially opposite to the outer circumferential surface of the shaft 22 with a radial gap, which is a minute bearing gap, intervening therebetween. The sleeve flange 512 is arranged to project radially outward from an upper end portion of the inner cylindrical portion 511. The sleeve flange 512 is arranged below the upper annular portion 221 and above the wall portion 232 of the lower annular member 23.

A lubricating oil 60 is arranged between a combination of the shaft 22 and the lower annular member 23 and a combination of the sleeve 51, the upper projecting portion 53, and the lower projecting portion 54 of the rotating member 31. A polyolester oil or a diester oil, for example, is used as the lubricating oil 60. The rotating member 31 is supported through the lubricating oil 60 to be rotatable with respect to the combination of the shaft 22 and the lower annular member 23. That is, the fluid dynamic bearing apparatus 6 is defined by the stationary body, which includes the shaft 22 and the lower annular member 23, a rotating body including the sleeve 51, the upper projecting portion 53, and the lower projecting portion 54, and the lubricating oil 60, which is arranged between the stationary body and the rotating body.

As illustrated in FIG. 3, the lubricating oil 60 includes an upper liquid surface 61 and a lower liquid surface 62. The upper liquid surface 61 is located between an outer circumferential surface of the upper annular portion 221 and an inner circumferential surface of the upper projecting portion 53 of the rotating member 31. That is, the outer circumferential surface of the upper annular portion 221 and the inner circumferential surface of the upper projecting portion 53 are arranged to together define an upper seal portion 71 arranged to hold the upper liquid surface 61 of the lubricating oil 60. In the upper seal portion 71, a radial distance between the outer circumferential surface of the upper annular portion 221 and the inner circumferential surface of the upper projecting portion 53 is arranged to gradually increase with increasing height. The upper liquid surface 61 of the lubricating oil 60 is accordingly attracted downward by surface tension to define a meniscus. This contributes to preventing a leakage of the lubricating oil 60 through the upper seal portion 71.

Meanwhile, the lower liquid surface 62 of the lubricating oil 60 is located between the outer circumferential surface of the wall portion 232 of the lower annular member 23 and an inner circumferential surface of the lower projecting portion 54 of the rotating member 31. That is, the outer circumferential surface of the wall portion 232 and the inner circumferential surface of the lower projecting portion 54 are arranged to together define a lower seal portion 72 arranged to hold the lower liquid surface 62 of the lubricating oil 60. In the lower seal portion 72, a radial distance between the outer circumferential surface of the wall portion 232 and the inner circumferential surface of the lower projecting portion 54 is arranged to gradually increase with decreasing height. The lower liquid surface 62 of the lubricating oil 60 is accordingly attracted upward by surface tension to define a meniscus. This contributes to preventing a leakage of the lubricating oil 60 through the lower seal portion 72.

In addition, the rotating member 31 includes a communicating hole 311 in addition to the central through hole 310. The communicating hole 311 is arranged to pass through the sleeve flange 512 in the axial direction radially outside of the central through hole 310. That is, the communicating hole 311 is arranged to join an opening defined in the upper surface of the sleeve flange 512 and an opening defined in a lower surface of the sleeve flange 512 to each other in the axial direction. The communicating hole 311 is also filled with the lubricating oil 60.

The lubricating oil 60 is thus arranged to continuously fill a space extending from the upper seal portion 71 to the lower seal portion 72 through a gap between the shaft 22 and the sleeve 51 and the communicating hole 311. Therefore, the lubricating oil 60 includes only the two liquid surfaces, the upper liquid surface 61 held by the upper seal portion 71 and the lower liquid surface 62 held by the lower seal portion 72. This contributes to reducing evaporation of the lubricating oil 60.

Figure 4:
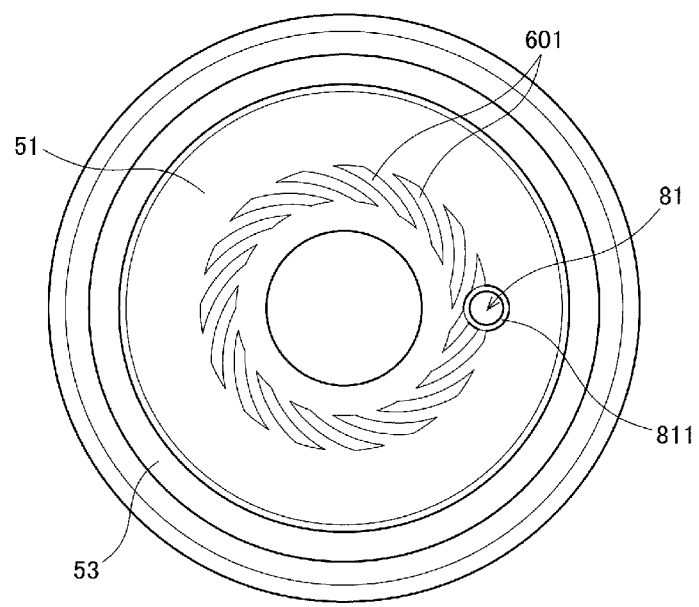
FIG. 4 is a partial top view of a rotating member according to the above preferred embodiment of the present invention.
Figure 5:
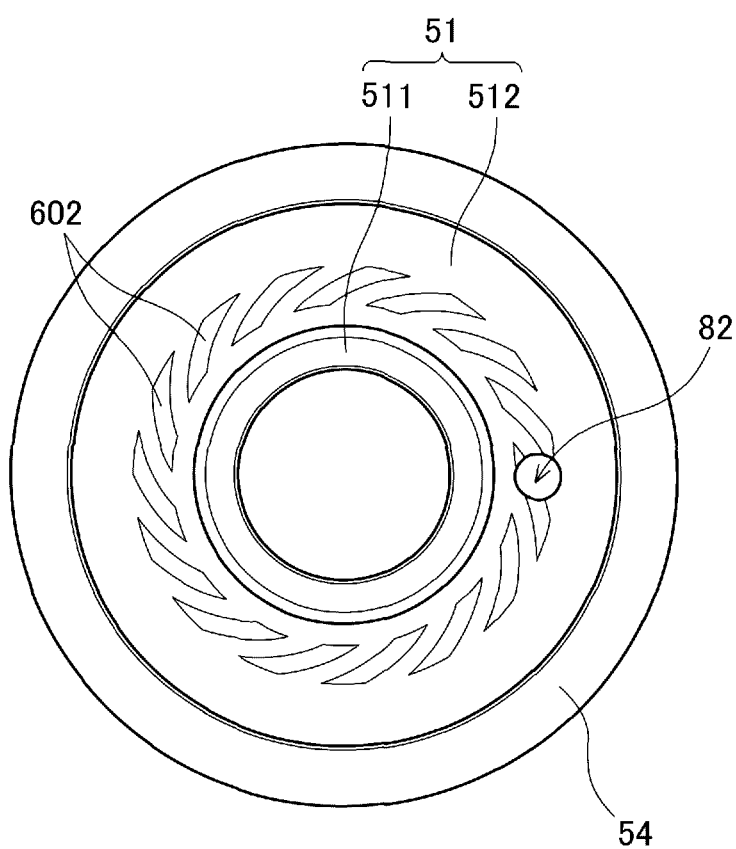
FIG. 5 is a partial bottom view of the rotating member according to the above preferred embodiment of the present invention.

FIG. 4 is a partial top view of the rotating member 31. As illustrated in FIG. 4, the rotating member 31 includes a first thrust dynamic pressure groove array 601 arranged in a spiral pattern in an upper surface of the sleeve 51. FIG. 5 is a partial bottom view of the rotating member 31. As illustrated in FIG. 5, the rotating member 31 includes a second thrust dynamic pressure groove array 602 arranged in a spiral pattern in the lower surface of the sleeve flange 512.

The rotating member 31 is arranged to rotate in one direction with respect to the shaft 22 and the lower annular member 23 while the spindle motor 11 is running. At this time, the first thrust dynamic pressure groove array 601 induces a dynamic pressure in a portion of the lubricating oil 60 which is present between the upper annular portion 221 and the sleeve 51. In addition, the second thrust dynamic pressure groove array 602 induces a dynamic pressure in a portion of the lubricating oil 60 which is present between the wall portion 232 of the lower annular member 23 and the sleeve flange 512. The rotating member is thus supported axially with respect to the shaft 22 and the lower annular member 23.

Note that the first thrust dynamic pressure groove array 601 may be defined in at least one of the lower surface of the upper annular portion 221 and the upper surface of the sleeve 51. Also note that the second thrust dynamic pressure groove array 602 may be defined in at least one of the upper surface of the wall portion 232 and the lower surface of the sleeve flange 512. Also note that each of the first and second thrust dynamic pressure groove arrays may be a groove array arranged in a herringbone pattern.

Figure 6:
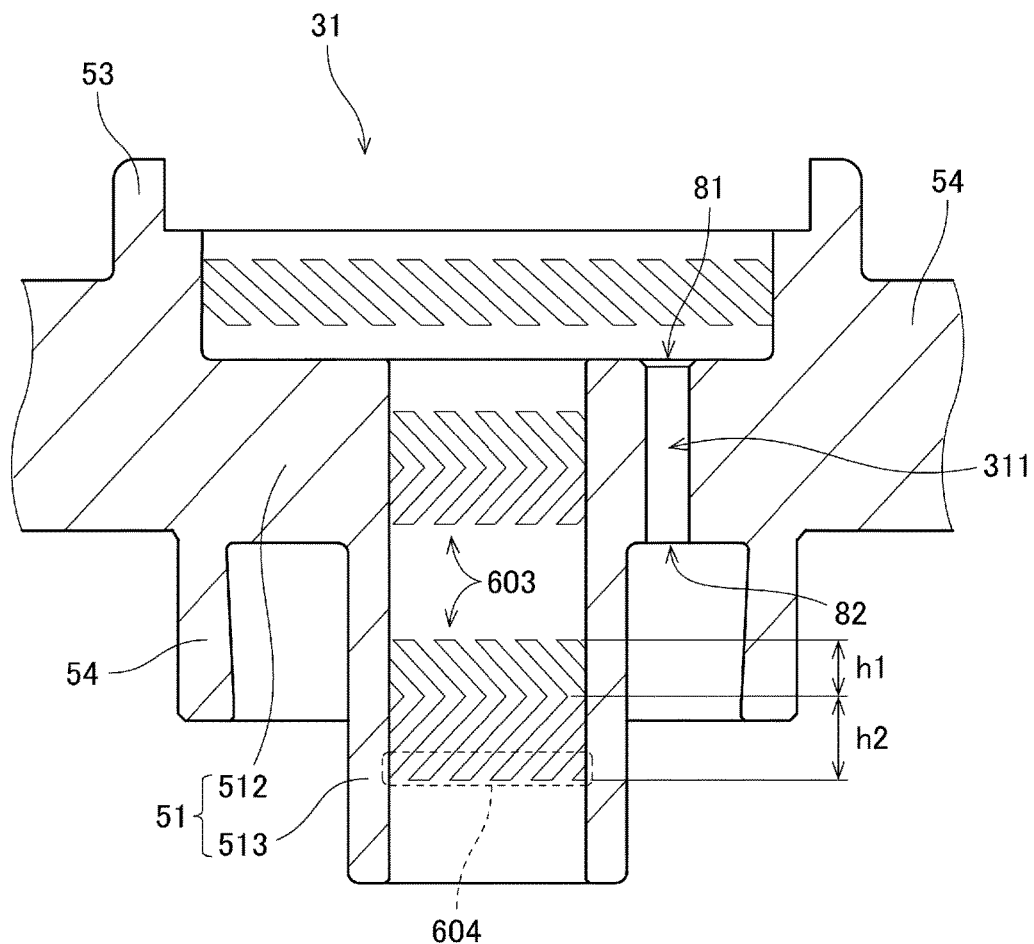
FIG. 6 is a partial vertical cross-sectional view of the rotating member according to the above preferred embodiment of the present invention.

FIG. 6 is a partial vertical cross-sectional view of the rotating member 31. As illustrated in FIG. 6, an inner circumferential surface of the sleeve 51 includes two radial dynamic pressure groove arrays 603 spaced from each other in the vertical direction and each of which is arranged in a herringbone pattern. The sleeve 51 is arranged to rotate in one direction with respect to the shaft 22 while the spindle motor 11 is running. At this time, each radial dynamic pressure groove array 603 induces a dynamic pressure in a portion of the lubricating oil 60 which is present between the shaft 22 and the sleeve 51. The sleeve 51 is thus supported radially with respect to the shaft 22. Note that the radial dynamic pressure groove arrays 603 may be defined in at least one of the outer circumferential surface of the shaft 22 and the inner circumferential surface of the sleeve 51.

Of the two groove arrays each of which is arranged in the herringbone pattern as illustrated in FIG. 6, the upper groove array includes grooves each of which includes an upper portion arranged above a bend position, and a lower portion arranged below the bend position and having an axial dimension equivalent to an axial dimension of the upper portion. Meanwhile, the lower groove array includes grooves each of which includes an upper portion arranged above a bend position and having an axial dimension h1, and a lower portion arranged below the bend position and having an axial dimension h2 greater than the axial dimension h1. Each groove of each of these groove arrays each of which is arranged in the herringbone pattern is filled with the lubricating oil 60.

Accordingly, while the spindle motor 11 is running, an upward pressure applied to a portion of the lubricating oil 60 which is present between the shaft 22 and the sleeve 51 is greater than a downward pressure applied to the portion of the lubricating oil 60 which is present between the shaft 22 and the sleeve 51. As a result, an upward flow of the lubricating oil 60 occurs in a radial gap defined between the shaft 22 and the sleeve 51.

That is, a lowermost end portion of the lower groove array arranged in the herringbone pattern defines a pumping groove array 604 arranged to generate a flow of the lubricating oil 60 between the shaft 22 and the sleeve 51. Note that the pumping groove array 604 may alternatively be spaced away from each radial dynamic pressure groove array 603. Also note that the pumping groove array 604 may be defined in the outer circumferential surface of the shaft 22, the upper surface of the sleeve 51, a lower surface of the sleeve 51, a lower surface of the upper annular portion 221, or an upper surface of the lower annular member 23. Also note that the pumping groove array 604 may be arranged either in the herringbone pattern or in a spiral pattern. Also note that grooves of the pumping groove array may alternatively be arranged between the grooves of any groove array arranged in the herringbone pattern.

An upward pressure is applied by the pumping groove array 604 to the lubricating oil 60 between the shaft 22 and the sleeve 51, and the lubricating oil 60 circulates in a manner as indicated by a broken line arrow in FIG. 3. That is, the lubricating oil 60 flows from the radial gap between the shaft 22 and the sleeve 51 into the communicating hole 311 through a gap between the upper annular portion 221 and the sleeve 51. Then, the lubricating oil 60 flows from the communicating hole 311 back into the radial gap between the shaft 22 and the sleeve through a gap between the lower annular member 23 and the sleeve 51. This circulation of the lubricating oil 60 makes it easier for any air bubble introduced into the lubricating oil 60 to be discharged to an outside through the upper liquid surface or the lower liquid surface 62. This contributes to preventing any air bubble from staying in the lubricating oil 60.

Referring to FIGS. 3 to 6, the communicating hole 311 includes an inlet 81 for the lubricating oil 60, an outlet 82 for the lubricating oil 60, and a tubular portion 83, which is tubular in shape. Because the lubricating oil 60 circulates in the manner as indicated by the broken line arrow in FIG. 3, an upper end opening of the communicating hole 311 defines the inlet 81. In addition, a lower end opening of the communicating hole 311 defines the outlet 82. The tubular portion 83 is arranged to extend in the axial direction in the sleeve flange 512 to join the inlet 81 and the outlet 82 to each other.

In the spindle motor 11, the inlet 81 of the communicating hole 311 is arranged to have an increased diameter. That is, as illustrated in FIG. 3, an opening area S1 of the inlet 81 is greater than a cross-sectional area S3 of the tubular portion 83. This makes it easier for the lubricating oil to flow into the communicating hole 311 than in the case where the opening area S1 of the inlet 81 is equal to the cross-sectional area S3 of the tubular portion 83. Moreover, because a flow of the lubricating oil 60 into the communicating hole 311 is thus promoted, the amount of a portion of the lubricating oil which flows toward the upper seal portion 71 instead of flowing into the communicating hole 311 is reduced. This contributes to preventing a leakage of the lubricating oil 60 through the upper seal portion 71.

Figure 7:
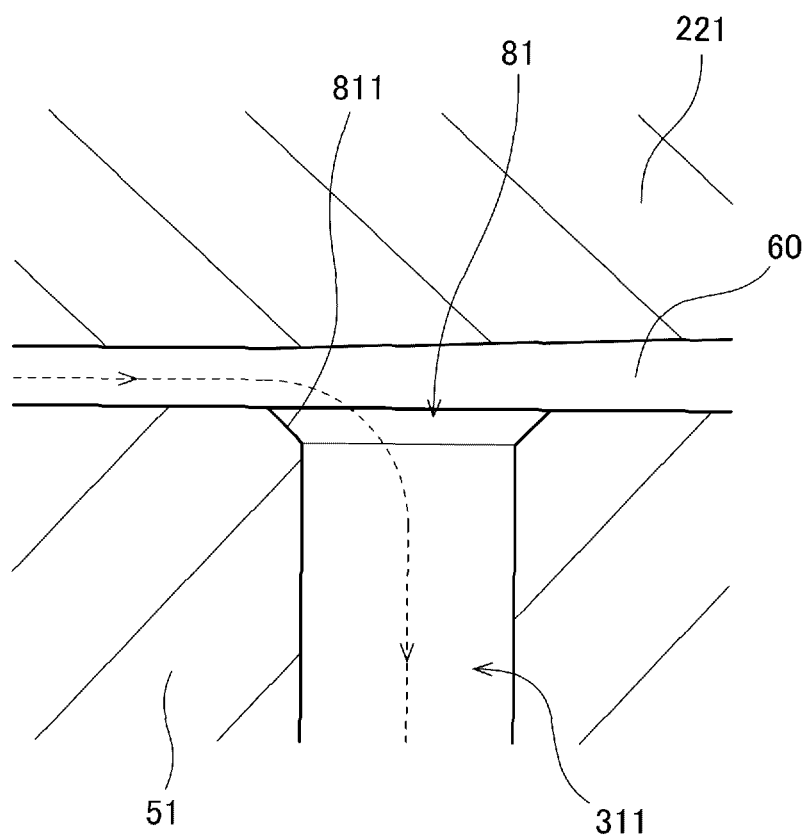
FIG. 7 is a partial vertical cross-sectional view of a fluid dynamic bearing apparatus according to the above preferred embodiment of the present invention.

FIG. 7 is a partial vertical cross-sectional view of the fluid dynamic bearing apparatus 6, illustrating the inlet 81 and its vicinity. As illustrated in FIG. 7, the sleeve 51 includes an edge portion arranged to define the inlet 81, and an inclined portion 811 arranged at the entire edge portion. The inclined portion 811 is a tapered inclined surface arranged to extend in a straight line in a section of the sleeve 51 including the rotation axis 9. The inclined portion 811 is defined by, for example, using a tool such as, for example, a drill. When the diameter of the inlet 81 is increased in a tapering manner as described above, the loss coefficient at the inlet 81 can be reduced to a greater extent than in the case where the diameter of the inlet 81 is increased by defining a shoulder at the inlet 81. That is, the flow of the lubricating oil 60 into the communicating hole 311 is further promoted. On the other hand, as illustrated in FIGS. 3 and 6, the outlet 82 has a straight shape. The outlet 82 having the straight shape means that the outlet 82 has a diameter equal to the diameter of the tubular portion 83. Accordingly, the loss coefficient at the inlet 81 is lower than a loss coefficient at the outlet 82.

In addition, as illustrated in FIG. 4, the inlet 81 is arranged at a radially outer end portion of the first thrust dynamic pressure groove array 601. Specifically, a portion of the inlet 81 is arranged radially inward of a radially outer end of the first thrust dynamic pressure groove array 601. In addition, another portion of the inlet 81 is arranged radially outward of the radially outer end of the first thrust dynamic pressure groove array 601. Moreover, the aforementioned inclined portion 811 is joined to some of the grooves of the first thrust dynamic pressure groove array 601.

On the other hand, referring to FIGS. 3, 5, and 6, the outlet 82 of the communicating hole 311 does not have an increased diameter. Therefore, an opening area S2 of the outlet is equal to the cross-sectional area S3 of the tubular portion 83, and the opening area S1 of the inlet 81 is greater than the opening area S2 and the cross-sectional area S3. Note, however, that the outlet 82 may alternatively be arranged to have an increased diameter to make the opening area S2 of the outlet 82 greater than the cross-sectional area S3 of the tubular portion 83. This will reduce a loss coefficient for the fluid at the outlet 82 as well as the loss coefficient for the fluid at the inlet 81. Accordingly, a flow of the lubricating oil 60 out of the communicating hole 311 will be promoted.

Here, a surface of the sleeve 51 which includes the inlet 81 is referred to as a first thrust bearing surface. The upper surface of the sleeve 51 is the first thrust bearing surface. In addition, a surface opposed to the first thrust bearing surface is referred to as a second thrust bearing surface. The lower surface of the upper annular portion 221 is the second thrust bearing surface.

While the spindle motor 11 is running, a radially inward pressure is applied by the first thrust dynamic pressure groove array 601 to a portion of the lubricating oil 60 which fills a gap between the first thrust bearing surface and the second thrust bearing surface. This pressure may act to hinder the flow of the lubricating oil 60 into the communicating hole 311. However, as illustrated in FIG. 4, at least a portion of the inlet 81 is arranged radially inward of the radially outer end of the first thrust dynamic pressure groove array 601 and radially outward of a radially inner end of the first thrust dynamic pressure groove array 601. This contributes to promoting a flow of the lubricating oil 60 into the communicating hole 311 within an area in which the first thrust dynamic pressure groove array 601 is defined. Accordingly, an effect of the dynamic pressure caused by the first thrust dynamic pressure groove array 601 and promotion of the flow of the lubricating oil 60 into the communicating hole 311 can be combined.

While preferred embodiments of the present invention have been described above, it will be understood that the present invention is not limited to the above-described preferred embodiments.

Figure 8:
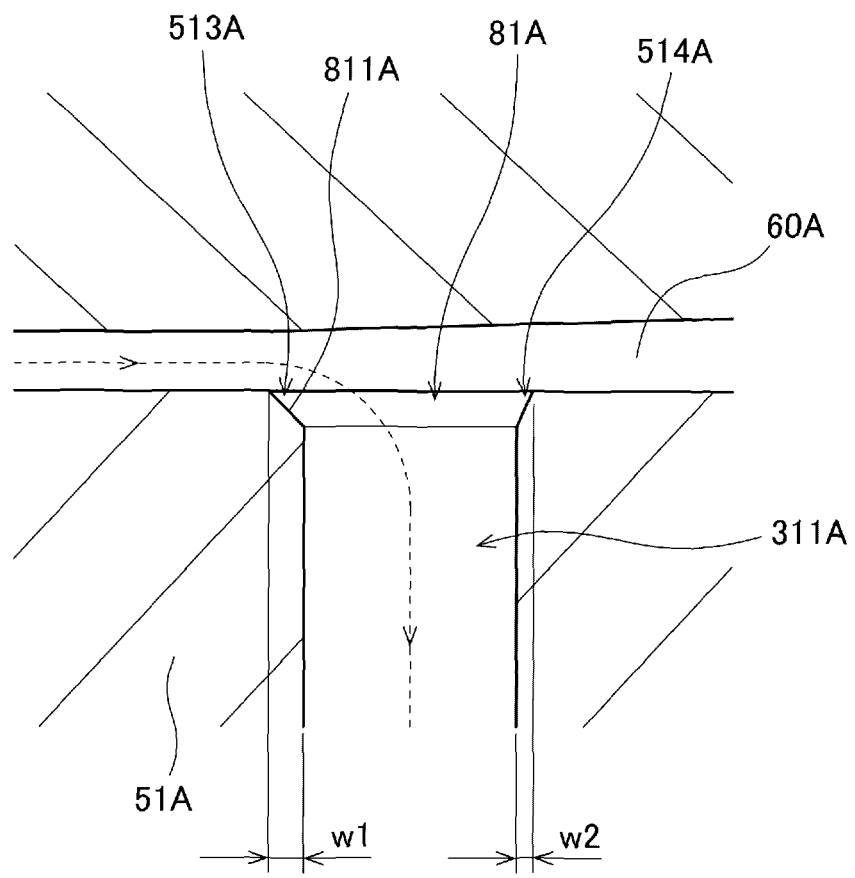
FIG. 8 is a partial vertical cross-sectional view of a fluid dynamic bearing apparatus according to a modification of the above preferred embodiment of the present invention.

FIG. 8 is a partial vertical cross-sectional view of a fluid dynamic bearing apparatus according to a modification of the above-described preferred embodiment. Also in the modification illustrated in FIG. 8, a sleeve 51A includes an edge portion arranged to define an inlet 81A, and an inclined portion 811A arranged at the entire edge portion. Note that, in the modification illustrated in FIG. 8, the inclined portion 811A is arranged to have an uneven width around the inlet 81A. Specifically, a radial width w1 of the inclined portion 811A at a radially inner edge portion 513A arranged radially inside of the inlet 81A is greater than a radial width w2 of the inclined portion 811A at a radially outer edge portion 514A arranged radially outside of the inlet 81A. Thus, the inclined portion 811A may be arranged to have different widths at the radially inner edge portion 513A and the radially outer edge portion 514A.

Note that, in order to improve a loss coefficient for a fluid at the inlet 81A, an inclination of the inclined portion 811A should not be too great or too small, and is preferably arranged, for example, in the range of 30° to 60°. In particular, a lubricating oil 60A flowing into a communicating hole 311A passes mainly the radially inner edge portion 513A of the edge portion defining the inlet 81A as indicated by a broken line arrow in FIG. 8. Accordingly, at least at the radially inner edge portion 513A, an inclination of the inclined portion 811A with respect to a central axis of the communicating hole 311A is preferably arranged in the range of 30° to 60°.

Figure 9:
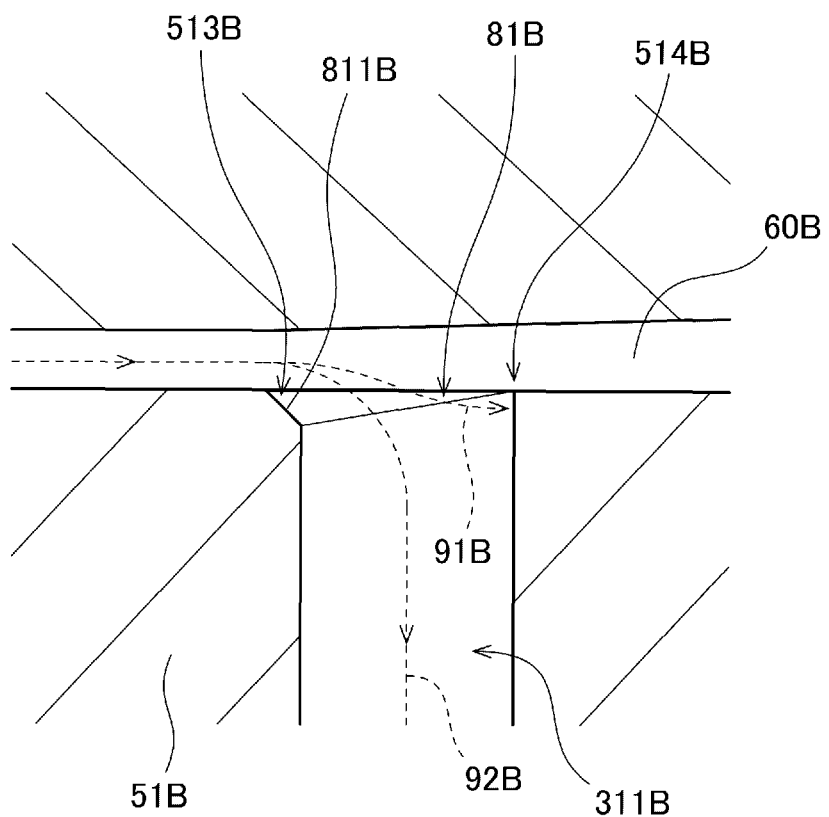
FIG. 9 is a partial vertical cross-sectional view of a fluid dynamic bearing apparatus according to a modification of the above preferred embodiment of the present invention.

FIG. 9 is a partial vertical cross-sectional view of a fluid dynamic bearing apparatus according to another modification of the above-described preferred embodiment. In the modification illustrated in FIG. 9, no inclined portion is arranged at a radially outer edge portion 514B of an edge portion of a sleeve 51B which defines an inlet 81B. That is, in the modification illustrated in FIG. 9, an inclined portion 811B is arranged at a radially inner edge portion 513B and not at the radially outer edge portion 514B. This contributes to preventing a lubricating oil 60B traveling radially outward toward the inlet 81B from flowing radially outward beyond the inlet 81B, as represented by a broken line arrow 91B in FIG. 9. As a result, a flow of the lubricating oil 60B into a communicating hole 311B is further promoted as represented by a broken line arrow 92B in FIG. 9.

Figure 10:
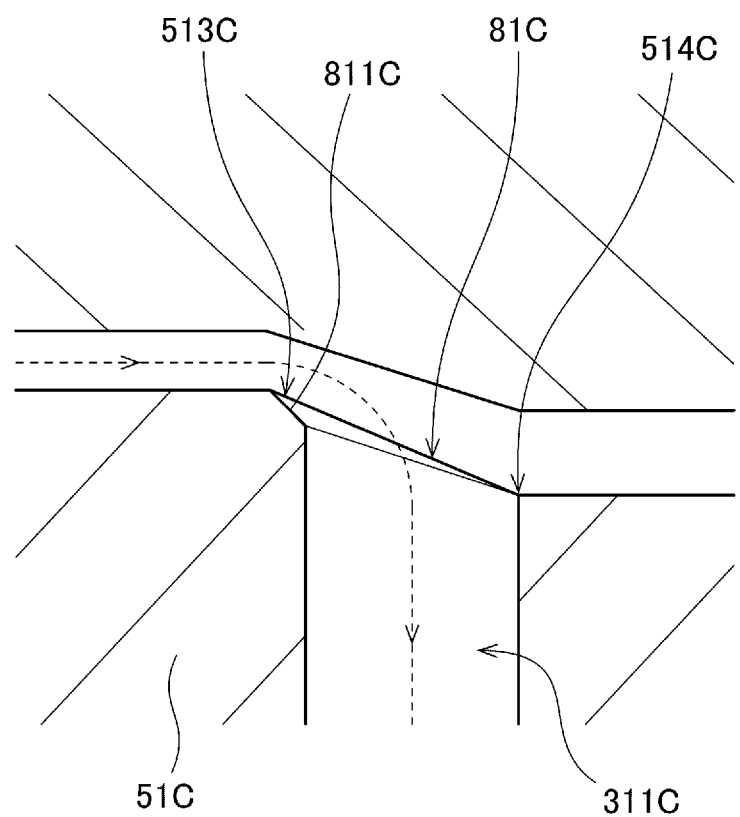
FIG. 10 is a partial vertical cross-sectional view of a fluid dynamic bearing apparatus according to a modification of the above preferred embodiment of the present invention.

FIG. 10 is a partial vertical cross-sectional view of a fluid dynamic bearing apparatus according to yet another modification of the above-described preferred embodiment. In the modification illustrated in FIG. 10, an inlet 81C of a sleeve 51C is arranged to have an opening inclined with respect to a plane perpendicular to a rotation axis. Thus, a radially inner edge portion 513C arranged radially inside of the inlet 81C and a radially outer edge portion 514C arranged radially outside of the inlet 81C are arranged at different axial positions. In addition, a distance from an axial middle of a communicating hole 311C to the radially inner edge portion 513C is greater than a distance from the axial middle of the communicating hole 311C to the radially outer edge portion 514C.

Thus, at the time of processing of the sleeve 51C, it is possible to apply a tool such as, for example, a drill, only to the radially inner edge portion 513C and not to the radially outer edge portion 514C. Accordingly, it is easy to define an inclined portion 811C only at the radially inner edge portion 513C.

Figure 11:
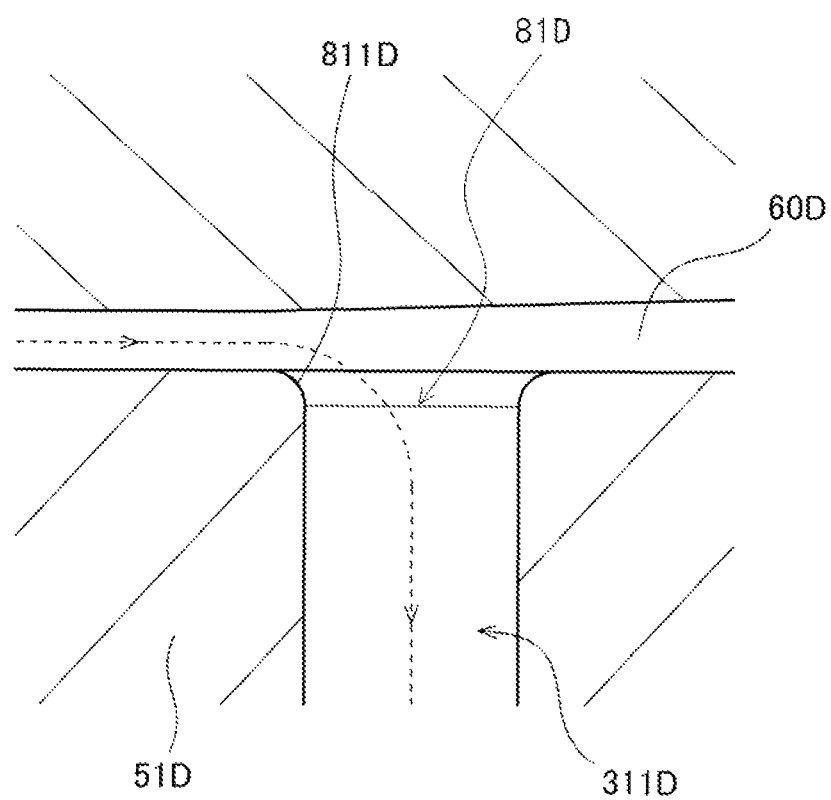
FIG. 11 is a partial vertical cross-sectional view of a fluid dynamic bearing apparatus according to a modification of the above preferred embodiment of the present invention.

FIG. 11 is a partial vertical cross-sectional view of a fluid dynamic bearing apparatus according to yet another modification of the above-described preferred embodiment. In the modification illustrated in FIG. 11, an inclined portion 811D is curved in a circular arc in a section of a sleeve 51D including a rotation axis. The inclined portion 811D is arranged to join an upper end surface of the sleeve 51D and an inside surface of the sleeve 51D which defines a communicating hole 311D to each other in a gentle manner. When the inclined portion 811D is curved to make an inclination of the inclined portion 811D continuously vary in the section of the sleeve 51D as described above, a loss coefficient for a fluid at an inlet 81D can be further reduced. Accordingly, a flow of a lubricating oil 60D into the communicating hole 311D is further promoted.

Figure 12:
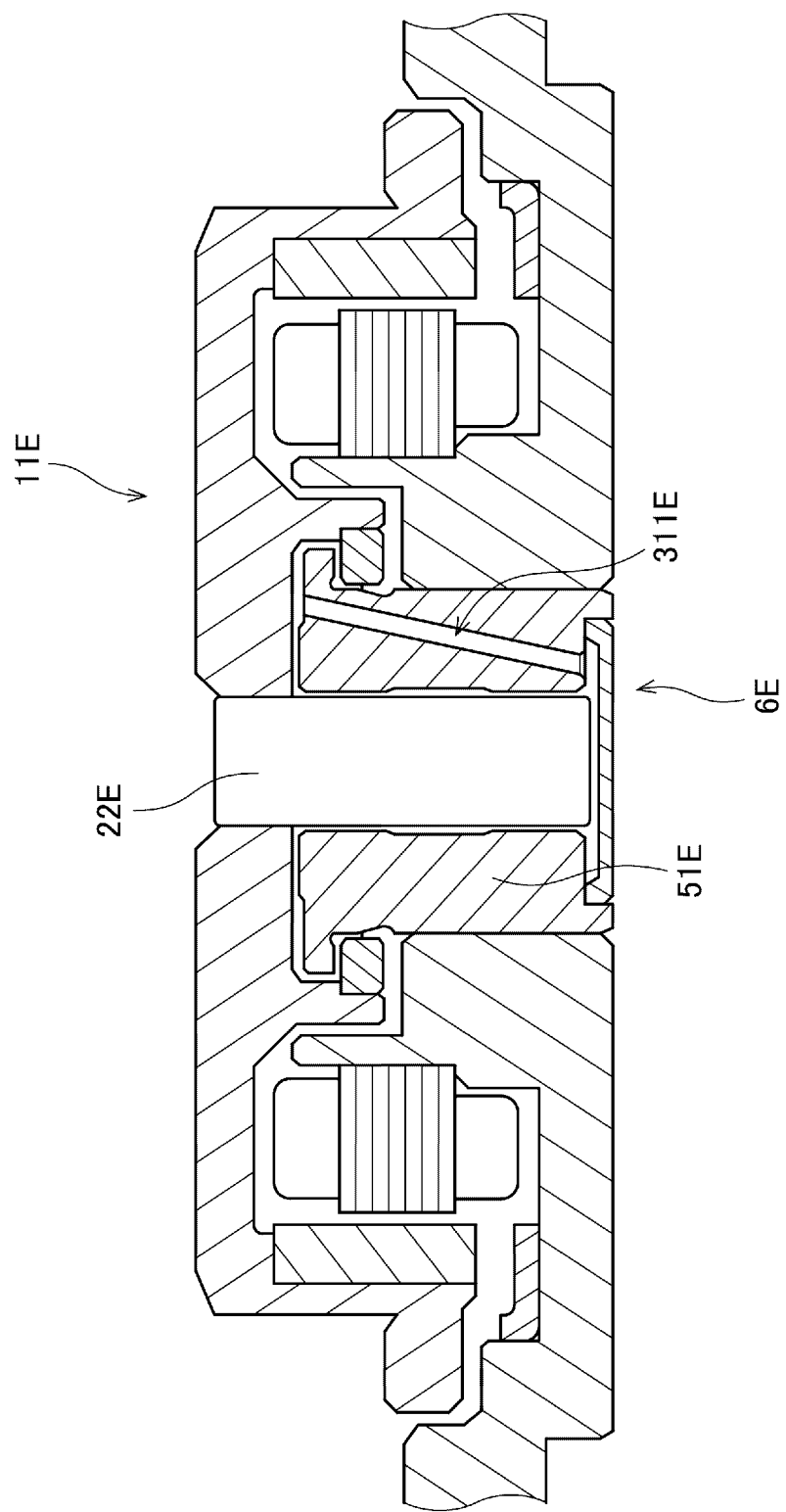
FIG. 12 is a vertical cross-sectional view of a spindle motor according to a modification of the above preferred embodiment of the present invention.

FIG. 12 is a vertical cross-sectional view of a spindle motor 11E according to yet another modification of the above-described preferred embodiment. The fluid dynamic bearing apparatus 6 according to the above-described preferred embodiment, in which the shaft 22 belongs to the stationary body, is a so-called fixed-shaft fluid dynamic bearing apparatus. In contrast, a fluid dynamic bearing apparatus 6E included in the spindle motor 11E illustrated in FIG. 12 is a so-called rotating-shaft fluid dynamic bearing apparatus, and a shaft 22E belongs to a rotating body while a sleeve 51E belongs to a stationary body.

Figure 13:
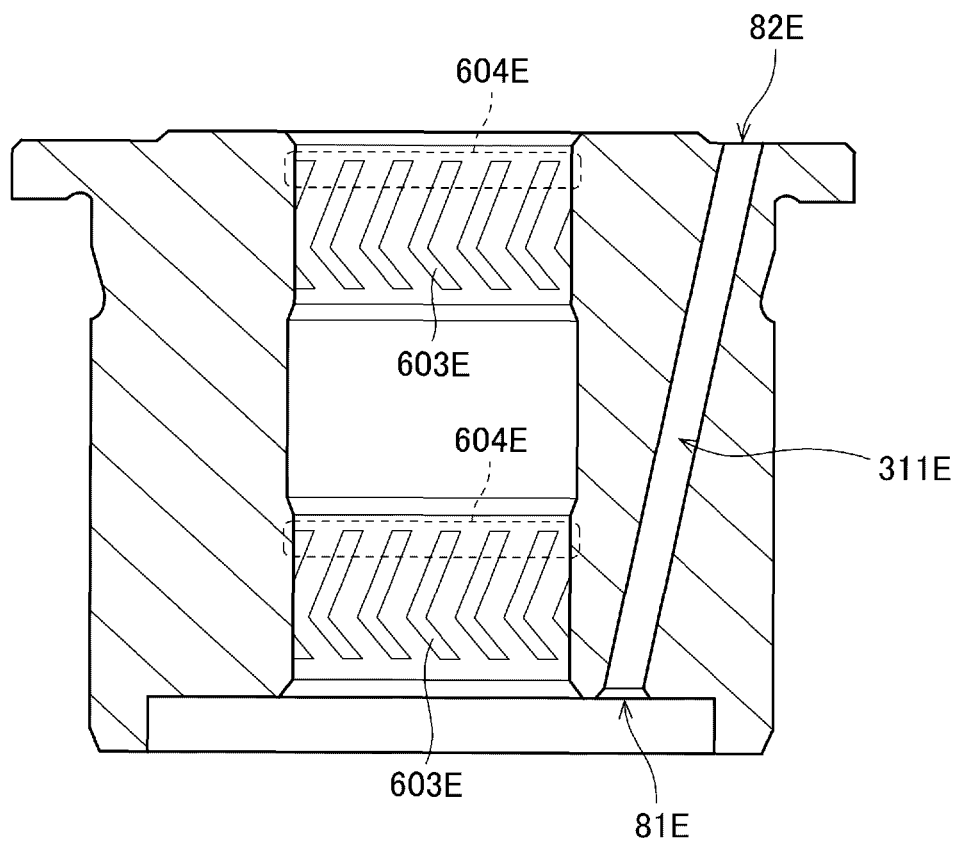
FIG. 13 is a vertical cross-sectional view of a sleeve according to a modification of the above preferred embodiment of the present invention.

FIG. 13 is a vertical cross-sectional view of the sleeve 51E. As illustrated in FIG. 13, an inner circumferential surface of the sleeve 51E includes two radial dynamic pressure groove arrays 603E spaced from each other in the vertical direction and each of which is arranged in a herringbone pattern. However, unlike the radial dynamic pressure groove arrays 603 according to the above-described preferred embodiment, the radial dynamic pressure groove arrays 603E according to the modification illustrated in FIG. 13 are arranged such that an uppermost end portion of each of the upper and lower groove arrays each of which is arranged in the herringbone pattern is extended to define a pumping groove array 604E. Accordingly, as illustrated in FIG. 14, a downward flow of a lubricating oil 60E is generated in a radial gap defined between the shaft 22E and the sleeve 51E while a spindle motor is running.

Figure 14:
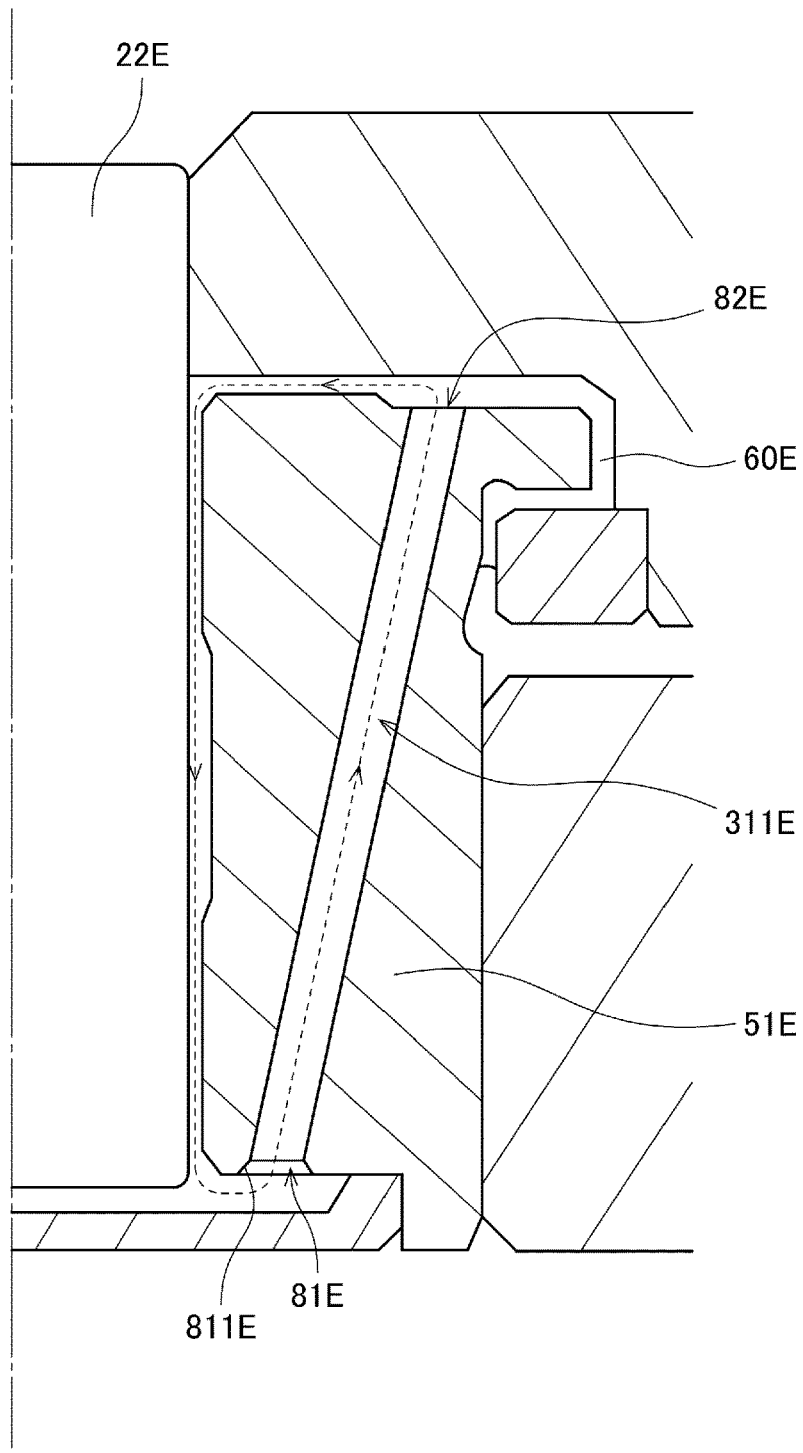
FIG. 14 is a partial vertical cross-sectional view of the spindle motor according to a modification of the above preferred embodiment of the present invention.

As a result, as illustrated in FIG. 14, the lubricating oil 60E flows from the radial gap defined between the shaft 22E and the sleeve 51E into a communicating hole 311E through a gap below the sleeve 51E. Then, the lubricating oil 60E flows from the communicating hole 311E back into the radial gap defined between the shaft 22E and the sleeve 51E through a gap above the sleeve 51E. Therefore, in the modification illustrated in FIGS. 12 to 14, a lower end opening of the communicating hole 311E defines an inlet 81E. In addition, an upper end opening of the communicating hole 311E defines an outlet 82E.

In this case, the sleeve 51E may include an inclined portion 811E arranged at the inlet 81E, which is defined in a lower surface of the sleeve 51E. In addition, as illustrated in FIGS. 12 to 14, the communicating hole 311E may be arranged to pass through the sleeve 51E obliquely with respect to the axial direction.

Note that spindle motors according to other preferred embodiments of the present invention may be motors arranged to rotate disks other than the magnetic disks, such as, for example, optical disks.

Also note that the detailed shape of any member may be different from the shape thereof as illustrated in the accompanying drawings of the present invention. Also note that features of the above-described preferred embodiments and the modifications thereof may be combined appropriately as long as no conflict arises.

Preferred embodiments of the present invention are applicable to fluid dynamic bearing apparatuses, spindle motors, and disk drive apparatuses.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A fluid dynamic bearing apparatus comprising:
    a stationary body;
    a rotating body supported to be rotatable with respect to the stationary body; and
    a lubricating oil arranged between the stationary body and the rotating body; wherein
    one of the stationary body and the rotating body includes:
        a shaft arranged along a rotation axis extending in a vertical direction; and
        an upper annular portion being annular and arranged around the shaft;
    another one of the stationary body and the rotating body includes a sleeve arranged below the upper annular portion, and including an inner circumferential surface arranged opposite to an outer circumferential surface of the shaft with a bearing gap intervening therebetween;
    the sleeve includes a communicating hole arranged to pass therethrough in an axial direction or obliquely with respect to the axial direction;
    the stationary body or the rotating body includes a groove array arranged in a herringbone pattern or a spiral pattern to generate a flow of the lubricating oil;
    the lubricating oil is arranged to fill the bearing gap, the groove array, and the communicating hole;
    the groove array is arranged to cause the lubricating oil to flow from the bearing gap into the communicating hole;
    the communicating hole includes an inlet through which the lubricating oil flows into the communicating hole, and an outlet through which the lubricating oil flows out of the communicating hole; and
    a loss coefficient at the inlet is lower than a loss coefficient at the outlet.

2. The fluid dynamic bearing apparatus according to claim 1, wherein the opening area of the inlet is greater than an opening area of the outlet.

3. The fluid dynamic bearing apparatus according to claim 1, wherein the sleeve includes an edge portion arranged to define the inlet, and an inclined portion arranged at at least a portion of the edge portion.

4. The fluid dynamic bearing apparatus according to claim 3, wherein the inclined portion of the sleeve is arranged at the entire edge portion.

5. The fluid dynamic bearing apparatus according to claim 4, wherein
    the edge portion of the sleeve includes:
        a radially inner edge portion arranged radially inside of the inlet; and
        a radially outer edge portion arranged radially outside of the inlet; and
    a radial width of the inclined portion at the radially inner edge portion is greater than a radial width of the inclined portion at the radially outer edge portion.

6. The fluid dynamic bearing apparatus according to claim 4, wherein
    the edge portion of the sleeve includes:
        a radially inner edge portion arranged radially inside of the inlet; and
        a radially outer edge portion arranged radially outside of the inlet; and
    the inclined portion is arranged at the radially inner edge portion and not at the radially outer edge portion.

7. The fluid dynamic bearing apparatus according to claim 6, wherein
    the radially inner edge portion and the radially outer edge portion are arranged at different axial positions; and
    a distance from an axial middle of the communicating hole to the radially inner edge portion is greater than a distance from the axial middle of the communicating hole to the radially outer edge portion.

8. The fluid dynamic bearing apparatus according to claim 3, wherein
    the outer circumferential surface of the shaft and the inner circumferential surface of the sleeve are arranged radially opposite to each other with a radial gap intervening therebetween, the radial gap being the bearing gap; and
    the groove array arranged in the herringbone pattern or the spiral pattern is arranged to cause the lubricating oil to flow from the radial gap into the communicating hole.

9. The fluid dynamic bearing apparatus according to claim 8, wherein
the stationary body includes the shaft and the upper annular portion; and
the rotating body includes the sleeve.

10. The fluid dynamic bearing apparatus according to claim 8, wherein
the sleeve includes a first thrust bearing surface including the inlet;
the one of the stationary body and the rotating body includes a second thrust bearing surface arranged opposite to the first thrust bearing surface;
one of the first thrust bearing surface and the second thrust bearing surface includes a thrust dynamic pressure groove array arranged to induce a dynamic pressure in the lubricating oil; and
at least a portion of the inlet is arranged radially inward of a radially outer end of the thrust dynamic pressure groove array and radially outward of a radially inner end of the thrust dynamic pressure groove array.

11. The fluid dynamic bearing apparatus according to claim 10, wherein a portion of the inlet is arranged radially inward of the radially outer end of the thrust dynamic pressure groove array, and another portion of the inlet is arranged radially outward of the radially outer end of the thrust dynamic pressure groove array.

12. The fluid dynamic bearing apparatus according to claim 10, wherein the thrust dynamic pressure groove array includes a groove joined to the inclined portion.

13. The fluid dynamic bearing apparatus according to claim 8, wherein one of the outer circumferential surface of the shaft and the inner circumferential surface of the sleeve includes:
a radial dynamic pressure groove array arranged to induce a dynamic pressure in the lubricating oil; and
the groove array arranged in the herringbone pattern or the spiral pattern.

14. The fluid dynamic bearing apparatus according to claim 3, wherein the inclined portion is an inclined surface arranged to extend in a straight line in a section of the sleeve including the rotation axis.

15. The fluid dynamic bearing apparatus according to claim 3, wherein the inclined portion is a surface arranged to extend in a curve in a section of the sleeve including the rotation axis, and arranged to join an axial end surface of the sleeve and an inside surface of the sleeve which defines the communicating hole to each other in a gentle manner.

16. The fluid dynamic bearing apparatus according to claim 1, wherein the communicating hole has the inlet at an upper end thereof and the outlet at a lower end thereof.

17. A spindle motor arranged to rotate a disk, the spindle motor comprising:
the fluid dynamic bearing apparatus of claim 1;
a stator fixed to the stationary body directly or indirectly with another member intervening therebetween; and
a disk support portion arranged to rotate together with the rotating body.

18. A disk drive apparatus comprising:
the spindle motor of claim 17; and
an access portion arranged to perform at least one of reading and writing of information from or to the disk, the disk being supported by the disk support portion of the spindle motor.

* * * * *